United States Patent
Butler et al.

(10) Patent No.: US 6,637,155 B1
(45) Date of Patent: *Oct. 28, 2003

(54) PLANT CONTAINER

(76) Inventors: Jason Trent Butler, 411 Palmola St., Lakeland, FL (US) 33803; Joel Freeman Butler, 411 Palmola St., Lakeland, FL (US) 33803

( * ) Notice: Subject to any disclaimer, the term of this patent is extended or adjusted under 35 U.S.C. 154(b) by 0 days.

This patent is subject to a terminal disclaimer.

(21) Appl. No.: 10/159,916

(22) Filed: Jun. 3, 2002

(51) Int. Cl.[7] ............................................... A01G 23/02
(52) U.S. Cl. ............................................................ 47/73
(58) Field of Search .................. 47/65.5, 65.7, 47/65.8, 66.1, 66.2, 66.7, 73, 76, 78, 80

(56) References Cited

U.S. PATENT DOCUMENTS

| | | | | |
|---|---|---|---|---|
| 532,687 A | * | 1/1895 | Mulhaupt ........................ | 47/73 |
| 2,942,823 A | * | 6/1960 | Chapman ...................... | 248/97 |
| 2,960,798 A | * | 11/1960 | Lindstaedt et al. ............. | 47/73 |
| 3,709,263 A | * | 1/1973 | Jackson et al. ......... | 139/420 R |
| 4,939,865 A | * | 7/1990 | Whitcomb et al. ............. | 47/77 |
| 5,301,465 A | * | 4/1994 | Caferro ........................ | 47/65.8 |
| 5,937,577 A | * | 8/1999 | Butler et al. ..................... | 47/73 |

FOREIGN PATENT DOCUMENTS

| | | | | |
|---|---|---|---|---|
| JP | 404346721 A | * | 12/1992 | ...................... 47/76 |
| JP | 406038640 A | * | 2/1994 | .................. 47/66.1 |

* cited by examiner

Primary Examiner—Charles T. Jordan
Assistant Examiner—Francis T. Palo
(74) Attorney, Agent, or Firm—George A. Bode; Bode & Associates

(57) ABSTRACT

A cylindrical plant container having a dual sidewall and a bottom wall is provided. The inner sidewall is constructed of woven polypropylene fabric and the outer sidewall is constructed of wire, such as chicken wire. The inner sidewall extends above the outer sidewall and is folded over the top of the outer sidewall and is fastened thereto. The inner sidewall also extends below the outer sidewall and is folded over the bottom of the outer sidewall and is fastened thereto. The bottom wall is removably connected to the combined inner and outer sidewall. The bottom wall is of a non-woven polypropylene material. The present invention is designed to be used in a plant nursery. The woven polypropylene permits air to penetrate through the sidewall permitting air pruning of the roots proximal the sidewall. This forces the roots to grow in both a horizontal and downward fashion resulting in a denser plant root system with no spiraling or circling of roots within the cylindrical plant container. The heat transfer characteristics of the polypropylene reduces the root ball temperature compared to other containers. The non-woven polypropylene bottom draws moisture into the container and allows small roots to grow downwardly into the ground.

2 Claims, 2 Drawing Sheets

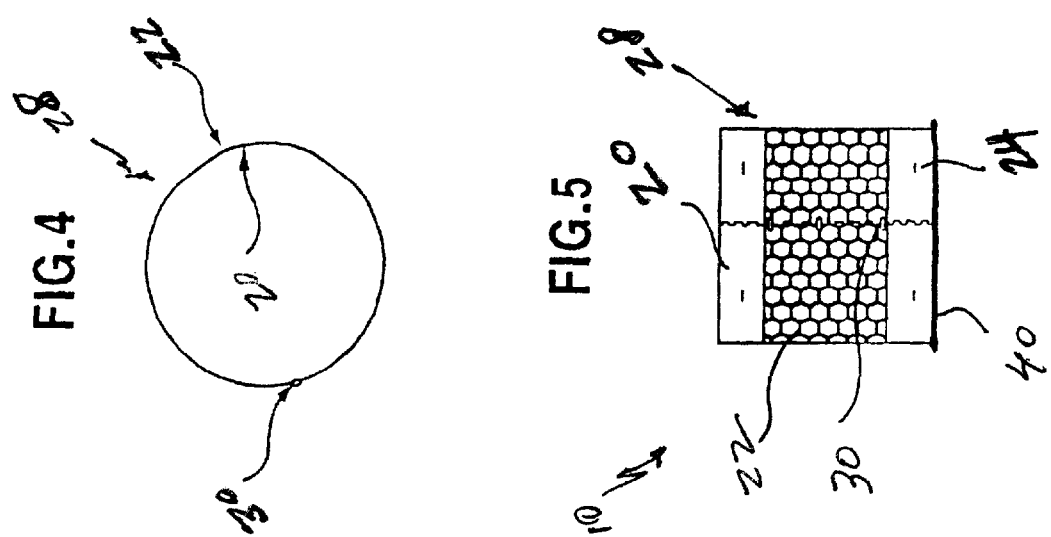
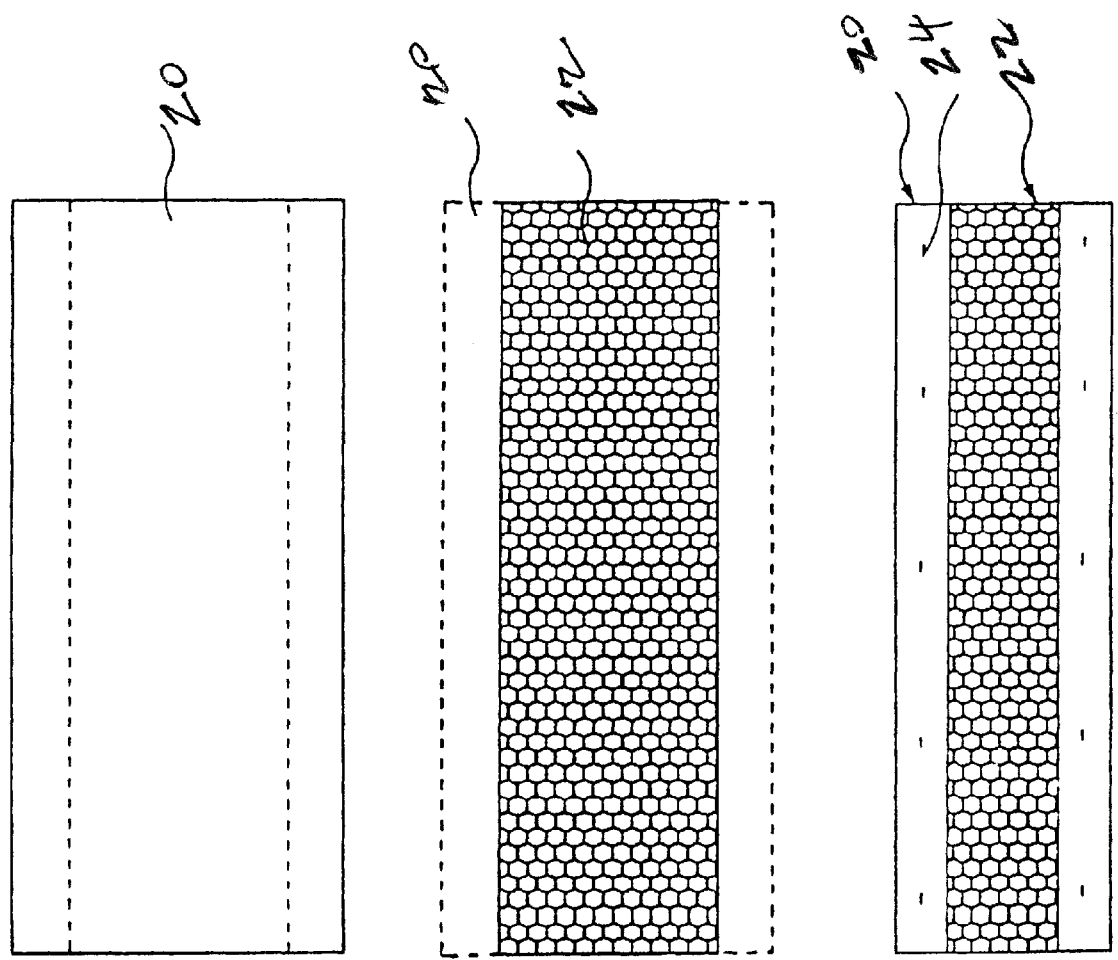

PLANT CONTAINER

This application is related to a previous application by the same inventors bearing U.S. Ser. No. 08/781,419 filed Nov. 27, 1996, and, now U.S. Pat. No. 5,937,577, issued Aug. 17, 1999. The entirety of this previous application is incorporated herein by reference as if set forth in full below

BACKGROUND OF THE INVENTION

1. Field of the Invention

The present invention relates to a new, reusable growing container that reduces unfavorably high temperatures within a plant's root ball and produces a beneficially modified root system by a technique called "air-root pruning." Both of these factors in turn produce a superior quality plant and alleviate trauma during transplanting of nursery grown trees and plants.

2. General Background

Since the mid-twentieth century, commercially grown plants have been cultivated in some type of container that provides ease of management and transportation. The container grown plant was immediately recognized as being beneficial over the traditional field grown plant, because the root systems were neither cut nor damaged when transported to a landscaping site. Over the years, nursery owners have developed ways of improving plant production with examples like new types of fertile media to environmentally safe pesticides and herbicides. Possibly, the most important fact recently discovered was that reducing the girdling of roots, created by solid plastic containers, increases not only a plant's growth and health but also its aesthetic quality.

In the past few decades, the popularity of the plastic container has grown rapidly and is now used consistently among nursery owners. Though popular, several drawbacks have been noted and supported by many research institutions.

First, these plastic containers conduct heat that can intensify root ball temperatures to unfavorable conditions, especially in nurseries located in warmer climates. This fact causes increased evapotranspiration and in turn creates a favorable environment for plant wilt. To combat this problem, nurseries have to increase watering times and water usage which is undesirable in this era of needed water conservation.

Second, root systems are allowed to become circular within the plastic container producing a girdling effect, consequently reducing the effectiveness of growth before and after transplanting. Stunted growth and slow adaptation at a newly planted landscape site are recognizable results of an unmanaged root system.

Among these noted disadvantages exist positive concepts about the plastic container that should not be overlooked when developing new types of growing containers. One economic benefit offered by the plastic container is its ability for reuse in the nursery. A nursery owner can also appreciate its shape which allows for convenient storage and space conservation.

Lately, several different types of manipulated plastic containers have surfaced commercially demonstrating the air-root pruning technique that aids in the prevention of spiraling and circular root patterns. Air root pruning is a method by which root tips are burnt when exposed to air. This causes the root to discontinue growth and branch outward into several new root tips. The branching effect is very beneficial because it is these laterally spreading root tips that provide the plant with the most uptake of water and nutrients necessary for survival. In solid containers, roots have no release possibilities essentially causing a plant's root system, after a substantial growth period, to "choke" and hinder its longevity.

Several containers are aimed at the air-root pruning technique have been patented.

For example, U.S. Pat. No. 5,937,577, issued to the applicants discloses a cylindrical plant container having a dual sidewall, the inner sidewall being constructed of polypropylene fabric and the outer sidewall being constructed of wire, the inner sidewall extending above the outer sidewall and being folded over the top of the outer sidewall and fastened thereto, and, the inner sidewall also extending below the outer sidewall and being folded over the bottom of the outer side wall and fastened thereto, the woven polypropylene permitting air to penetrate through the sidewalls permitting air pruning of the roots proximate the sidewall, thus forcing the roots to grow in both a horizontal and downward fashion resulting in a denser plant root system with no spiraling or circling of roots within the cylindrical plant container, the heat transfer characteristics of the polypropylene reducing the root ball temperature.

Patented containers such as U.S. Pat. Nos. 4,442,628; 4,497,132; 5,241,784 all teach containers for plants.

First, the aluminum aids in increasing the root temperature which is not desired by growers.

Secondly, the high production cost of the completed aluminum ring is not only a burden financially, but it also pressures the nursery owner into removing the ring before shipping for reuse.

The present invention provides a solution for all of the previously mentioned reoccurring problems.

With it being very economical to produce, at under half the cost of the aluminum grow ring, the present invention allows nurseries to transport plants with the container supporting the root ball.

As will be seen more fully below, the present invention is substantially different in structure, methodology and approach from that of prior plant containers.

SUMMARY OF THE PRESENT INVENTION

The preferred embodiment of plant container of the present invention solves the aforementioned problems in a straight forward and simple manner.

Broadly, the present invention contemplates a cylindrical container comprised of a polypropylene fabric supported by means of honeycomb "chicken" wire. The cylinder is open at the top and bottom and may be placed on the ground or upon a chosen material determined and preferred by the user.

In view of the above, it is an object of the present invention is to provide a new, superior growing container which will decrease temperatures within the root ball of nursery grown plants found in warmer climates, therefore, aiding in nursery water management and allowing for improved growth and overall aesthetic appearance.

A further object of the present invention, while accomplishing the above objective, is to provide a modified, beneficial root pruned plant by means of a technique known as "air-root pruning." This technique not only produces a more beautiful, healthy plant in the nursery, but also reduces the chance of shock, gridling, and death during and after transplanting into a landscape site.

A further object of the present invention is to provide a new, superior growing container which will decrease temperatures within a plant's root ball.

In view of the above, an object of the present invention is to provide a plant container which prevents spiraling and circular root patterns.

Another feature of the present invention is a plant container which is relatively simple structurally and thus simple to manufacture.

In view of the above, a feature of the present invention is to provide a plant container which is simple to use.

These main objectives and other objects and features of the present invention will become apparent and given detail (and other factors) revealed later on in this reading and supported by the accompanying drawing, the description given herein, and the appended claims.

BRIEF DESCRIPTION OF THE DRAWING

For a further understanding of the nature and objects of the present invention, reference should be had to the following description taken in conjunction with the accompanying drawings in which like parts are given like reference numerals and, wherein:

FIG. 1 is a plan view of the polypropylene fabric, with perorated lines showing prospective placement of "honeycomb" chicken wire;

FIG. 2 is a plan view showing the "honeycomb" chicken wire centered on the top of the polypropylene fabric (now designated by the perforated lines) of FIG. 1;

FIG. 3 is a view showing the polypropylene fabric folded over and stapled to the "honeycomb" chicken wire of FIGS. 1 and 2, allowing the top and bottom edges of the two (2) individual sidewalls to now act as one (1) sidewall, as is with the side edges;

FIG. 4 is a top or bottom plan view of the incomplete or "bottomless" present invention after each side edge was clasped together, but before the bottom is attached;

FIG. 5 is a side view of the present invention after being completed and demonstrates that it is cylindrical and stands vertically;

DETAILED DESCRIPTION OF THE PREFERRED EMBODIMENT

Figure 6:
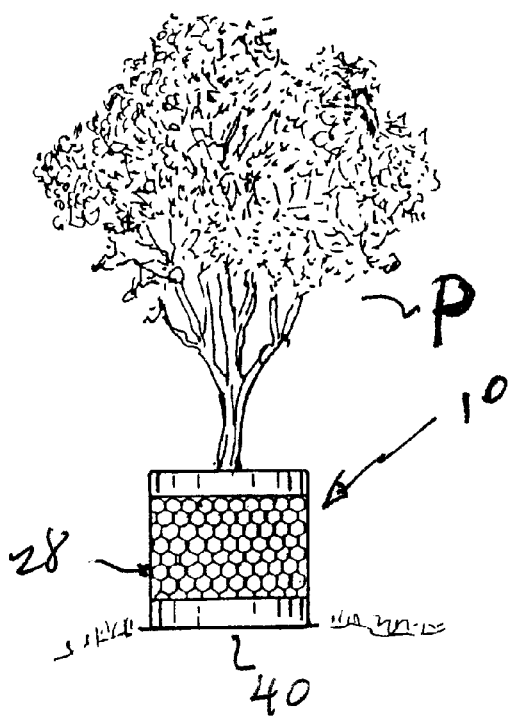
FIG. 6 is a side view showing a plant and its associated growing media residing within the plant container; and, FIG. 7 is a bottom perspective view showing a plant and its associated growing media residing within the plant container.
Figure 7:
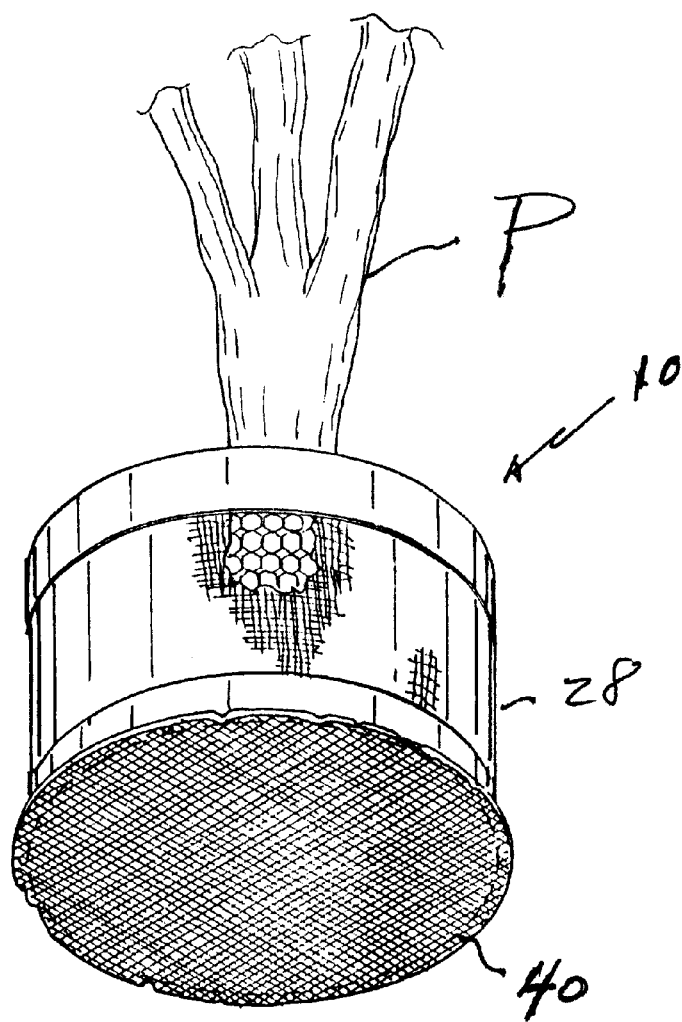

The present invention 10 is a new growing container defined as an above-ground air-root pruning ring meant for use in plant nurseries located in all types of suitable growing climates. A tightly woven polypropylene fabric sidewall 20, ordinarily utilized as a weed barrier in nurseries, is used as the sidewall of the present invention, while "chicken" net wire 22, with its "honeycomb" design, is the source of support for the polypropylene fabric, potting soil and the plant P. (Wire 22 may also be a rectangular galvanized utility wire mesh). This specific type of wire was chosen because of its excellent support, the elimination of a "sleeve" which is necessary when using "grow-bags," and its ease of assembly. The combination of these two relatively well known, inexpensive products has constructed a totally different product than the two could do singularly and has created important benefits.

The first benefit of the present invention is the ability of the woven polypropylene fabric to sidewall to allow a breathing (cooling) action to occur within the ring. This is due to the low mass of the fabric, thus, the transfer of heat into the root ball and/or adjacent potting soil is less than that of a solid plastic or aluminum container.

The standard plastic or aluminum containers used in nurseries of warm weather climates can cause high temperatures in root zones which is truly undesirable. Many growers will place plants in close proximity to each other to shade the plastic or aluminum container sidewalls. This may reduce soil temperatures within the container, but at the same time this spacing method will hinder a plant's canopy ability to spread producing a less desirable physical appearance. The present invention solves this problem by allowing the grower to increase space between plants while not having to worry about intolerable root temperatures.

Research has proven that a plant with a cooler root zone shows overall improved growth. One significant element effected by high temperatures in root balls is the production of callus tissue. Callus tissues are new cells responding to wounded plant material, in this case found in the root system, leading to the production of new adventitious roots. It should be noted that the new adventitious roots and callus are delicate and easily damaged. It is understood that callus production is retarded at ninety (90 F) degrees Fahrenheit and higher, and, that cell injury becomes more evident as the temperature continues to rise. Depending on certain types of plants, death of cells can begin to occur at one hundred and four (104 F) degrees Fahrenheit, and, this rate increases rapidly as the temperatures rise (Hartmann, Kester and Davies, Jr. @ Pp. 9 and 320). Therefore, it is extremely important to keep root ball temperatures at optimal levels for maximum plant production. This is accomplished by the present invention and not by other air-root pruning containers.

A second important benefit of the present invention is its superior air-root pruning ability over many of the other patented containers. Other containers use slits in the sidewalls that are placed one (1") inch apart and are not providing the full potential for air-root pruning.

Extra water and nutrient uptake by a plant's root system requires less watering and fertilizing by the nursery.

A third major advantage of the present invention is the option of removing the bottom wall allowing a nursery owner to set the container in the field or on any preferred surface, i.e., bare ground, woven covers, porous cloth fibers, plastic ground covers, or any like material.

The fourth significant benefit of the present invention is the price reduction that can be obtained, creating a more economical approach to container production in the horticulture industry.

Referring now to the drawing, and in particular FIGS. 1–5, the preferred embodiment 10 of the present invention is normally assembled in a seven (7) gallon size without the ring losing any sturdiness. Any sizes above twenty-five (25) gallons requires the "honeycomb" chicken wire be replaced with a heavier gauge wire with square or rectangular style mesh. (Again, wire 22 may also be a rectangular galvanized utility wire mesh).

For the purpose of the present invention a seven (7) gallon ring will be set as the standard for measurements, etc., and measurements of the other ring sizes will not be cited, herein. The heights, widths, lengths and diameters of the remaining rings can be determined by using simple mathematical formulae. The measurements of the seven (7) gallon ring are twelve (12") inches in height (FIGS. 3 and 5), one-eighth (⅛") of an inch in width (FIG. 4), forty-four (44") inches in length (FIG. 3), and, has a diameter of thirteen (13") inches in completed form (FIG. 4). The detailed process for manufacturing the plant container of the present invention is clarified below.

A six feet by three hundred feet (6'×300') roll of polypropylene fabric sidewall is cut into one and one-half (1½') foot wide sections (allowing for overlap) and then cut into forty-four (44") inch lengths, whereby three hundred and twenty-seven (327) polypropylene fabric sides are produced from a single roll (FIG. 1). Next, a one foot by one hundred and fifty feet (1'×150') roll of "honeycomb" chicken wire is cut into forty-four (44") inch lengths, whereby forty (40) "honeycomb" chicken wire sides are produced per roll (FIG. 1).

The polypropylene fabric sidewall 20 is laid flat with the "honeycomb" chicken wire 22 centered on top. The extra three (3") inches of polypropylene fabric found at the top and bottom edges is then folded over and stapled with one-fourth (¼") of an inch galvanized metal staples 24 to the "honeycomb" chicken wire 22, all the way across at intervals of eight (8") using a total of ten (10) staples per ring (FIG. 3). Once the combined sidewall 28 is produced, both side edges are connected together creating a circle, hence called a ring, with a total of five (5) C-Ring fasteners 30, each eleven-sixteenth (11/16") of an inch in size per completed ring. A fastener 30 is clasped on both the top and bottom edges where the polypropylene fabric of one side edge slightly overlaps the second adjoining or adjacent polypropylene fabric side edge. Three (3) C-Ring fasteners 30 are also clasped in the middle of the side edges at equidistant joining adjacent "honeycomb" sections together (FIG. 5). A non-woven, polypropylene geotextile fabric bottom 40 is affixed (by conventional means such as stapling, interconnecting and twisting wire ends or spot welding) to the bottom of combined sidewall 28. Bottom is preferably removably affixed by such stapling to give the user the option of removing bottom wall 40 to allowing the user to set the container in the field. This bottom 40 does away with guy wires (used to secure a plant to a tree) and yet still draws moisture and allows small roots to grow downwardly and "tack" or anchor into the ground.

After being manufactured the plant containers are conveniently stacked in groups of ten (10), twenty (20), thirty (30) or other multiple of ten, for easy accountability, shipment and storage. With all of the benefits stated above, the present invention shall prove to have a positive effect on the horticulture industry. Cooler root temperatures, no root girdling, price reductions and less materials all play key roles in producing a favorable, marketable, environmentally friendly product that will aid nursery owners in producing quality plants.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. A container for supporting and storing live plants above ground, said container including:
    a. an outer sidewall comprised of wire mesh, said outer sidewall having a top edge, a bottom edge, a right edge and a left edge;
    b. an inner sidewall constructed of a fabric material having a top edge, a bottom edge, a right edge and a left edge, said outer sidewall right edge being connected to said outer sidewall left edge and said inner sidewall right edge being connected to said inner sidewall left edge, thereby forming a generally cylindrical plant container, said inner sidewall top edge being folded over and secured to said outer sidewall top edge, said inner sidewall bottom edge being folded over and secured to said outer sidewall bottom edge, whereby, said inner sidewall will reside proximate the growing medium in which the plant resides and said outer sidewall will provide support permitting said container to stand in a vertical fashion, said fabric material permitting air to penetrate through said cylindrical plant container; and,
    c. a bottom wall removably connected to said generally cylindrical container formed by said connected inner and outer sidewalls, said bottom wall comprising a non-woven polypropylene material, and, said sidewall fabric material comprising a woven polypropylene material, whereby, said container will draw moisture and allow small roots to grow downwardly into the ground.

2. A method of manufacturing a container for supporting and storing live plants above ground, comprising:
    a. providing an outer sidewall comprised of wire mesh, said outer sidewall having a top edge, a bottom edge, a right edge and a left edge;
    b. providing an inner sidewall constructed of a fabric material having a top edge, a bottom edge, a right edge and a left edge, said outer sidewall right edge being connected to said outer sidewall left edge and said inner sidewall right edge being connected to said inner sidewall left edge, thereby forming a generally cylindrical plant container, said inner sidewall top edge being folded over and secured to said outer sidewall top edge, said inner sidewall bottom edge being folded over and secured to said outer sidewall bottom edge, whereby, said inner sidewall will reside proximate the growing medium in which the plant resides and said outer sidewall will provide support permitting said container to stand in a vertical fashion, said fabric material permitting air to penetrate through said cylindrical plant container; and,
    c. connecting a bottom wall to said generally cylindrical container formed by said connected inner and outer sidewalls, said bottom wall comprising a non-woven polypropylene material, and, said sidewall fabric material comprising a woven polypropylene material, whereby, said container will draw moisture and allow small roots to grow downwardly into the ground.

* * * * *